US012600339B2

(12) United States Patent　(10) Patent No.:　US 12,600,339 B2

McNally et al.　(45) Date of Patent:　Apr. 14, 2026

(54) LEAK DETECTION FOR PNEUMATIC BRAKING SYSTEMS

(71) Applicant: ZF CV Systems Global GmbH, Bern (CH)

(72) Inventors: Patrick George McNally, Macomb, MI (US); Joerg Moellenhoff, Royal Oak, MI (US); Gerd Roters, Wunstorf (DE)

(73) Assignee: ZF CV Systems Global GmbH, Bern (CH)

( * ) Notice: Subject to any disclaimer, the term of this patent is extended or adjusted under 35 U.S.C. 154(b) by 720 days.

(21) Appl. No.: 18/046,766

(22) Filed: Oct. 14, 2022

(65) Prior Publication Data

US 2024/0123965 A1　Apr. 18, 2024

(51) Int. Cl.
B60T 17/22 (2006.01)
B60Q 9/00 (2006.01)
(Continued)

(52) U.S. Cl.
CPC ................ B60T 17/22 (2013.01); B60Q 9/00 (2013.01); B60T 8/176 (2013.01); B60T 13/683 (2013.01);
(Continued)

(58) Field of Classification Search
CPC .......... B60T 17/22; B60T 13/70; B60T 8/176; B60T 13/683; B60T 2270/88; B60T 17/221; B60T 2270/10; B60T 8/885; B60T 13/662; B60T 2270/403; B60T 2270/406; B60Q 9/00; G01M 3/26
See application file for complete search history.

(56) References Cited

U.S. PATENT DOCUMENTS 6,126,247 A　10/2000　Paul et al.
2012/0080935 A1　4/2012　Steinberger et al.
(Continued)

FOREIGN PATENT DOCUMENTS

DE　10 2015 121 480 A1　6/2017
WO　2010/094481 A2　8/2010
(Continued)

OTHER PUBLICATIONS

German Patent No. DE 102009009811 to Steinberger et al published on Sep. 2, 2010.*

(Continued)

*Primary Examiner* — Pamela Rodriguez
(74) *Attorney, Agent, or Firm* — Walter Ottesen, P.A.

(57)　ABSTRACT

The disclosure relates to a leak detection system for a pneumatic braking system of a vehicle. The pneumatic braking system has a control unit, a pneumatic circuit, and an air tank configured to supply pneumatic pressure to the pneumatic circuit. The pneumatic circuit has a plurality of valves configured to be individually controlled by the control unit. The link detection system includes program code configured, when executed by a processor, to individually control the valves of the pneumatic circuit so as to isolate a sub-circuit of the pneumatic circuit. The leak detection module is configured to monitor a pressure in the pneumatic circuit for leaks, wherein the leak detection module detects a leak in the sub-circuit if the pressure decreases while the sub-circuit is isolated.

17 Claims, 7 Drawing Sheets

(51) Int. Cl.
    *B60T 8/176*         (2006.01)
    *B60T 13/68*         (2006.01)
    *G01M 3/26*         (2006.01)

(52) U.S. Cl.
    CPC ........... *G01M 3/26* (2013.01); *B60T 2270/10*
        (2013.01); *B60T 2270/88* (2013.01)

(56)         References Cited

U.S. PATENT DOCUMENTS

| | | | |
|---|---|---|---|
| 2018/0297574 A1* | 10/2018 | Zimmermann | ....... B60T 8/4081 |
| 2019/0337502 A1* | 11/2019 | Farres | ................... B60T 15/027 |
| 2021/0122350 A1 | 4/2021 | Farres et al. | |
| 2023/0256947 A1 | 8/2023 | van Thiel | |

FOREIGN PATENT DOCUMENTS

| | | | |
|---|---|---|---|
| WO | 2013/093545 A1 | 6/2013 |
| WO | 2016/012354 A1 | 1/2016 |
| WO | 2019/210956 A1 | 11/2019 |
| WO | 2022/106303 A1 | 5/2022 |

OTHER PUBLICATIONS

Extended European Search Report of the European Patent Office dated Mar. 13, 2024 in corresponding European application 23199595. 2.

\* cited by examiner general electrical line
digital sensor connection
Vehicle CAN connection 1
Vehicle CAN connection2
Trailer PLC connection
System CAN connection 1
System CAN connection 2
LIN connection pneumatic line circuit I
pneumatic line circuit II
pneumatic line merged I+II
electric supply circuit 1
electric supply circuit 1

LEAK DETECTION FOR PNEUMATIC BRAKING SYSTEMS

TECHNICAL FIELD

The disclosure relates to a leak detection system for pneumatic braking systems and a method of detecting leaks in pneumatic braking systems.

BACKGROUND

Brake system related violations comprise the largest percentage of all out of service violations cited in North American roadside inspections. Of these violations, a vast majority could be attributed to brake tubing, leakage or overall poor braking performance. Customers need a reliable and efficient way for detecting potential violations in the pneumatic braking systems of their vehicles.

Such leaks in a pneumatic braking system degrade the quality of the braking system. Further, an increased run time of the compressor due to leaks can reduce the fuel efficiency. Pneumatic braking systems are prone to developing leaks due to the sheer complexity of such systems. With the number of fittings, lines, seals, et cetera, there are numerous locations where leaks can develop. In existing pneumatic braking systems, in order to locate the leak, an operator or a technician servicing the system must either visually see the leak or audibly hear it in order to locate it. Such detection methods are not reliable or efficient as the pneumatic braking system spans the entire length of the vehicle. Such leaks can reduce the effectiveness of the pneumatic braking system, which can negatively impact safety. However, if a leak is detected by an inspector, the vehicle will be taken out of service by the inspector. Being taken out of service not only disrupts the driver's current trip but can also have negative effects on the driver's and/or a fleet's public safety records.

Known methods of detecting leaks require a technician to connect a testing device into the pneumatic braking system and actively test each circuit for leakage. Because this requires the connection of pneumatic lines and/or fittings, this process should only be undertaken by a specially trained technician. Distinct circuits of the pneumatic braking system cannot be isolated via an external device because the existing electronic control valves, for example, 3/2 valves and ABS valves, cannot be actuated as they are inline in the pneumatic braking system.

SUMMARY

It is an object of the disclosure to provide a leak detection system for detecting the location of a leak in a pneumatic braking system.

The aforementioned object can, for example, be achieved via a leak detection system for a pneumatic braking system of a vehicle. The pneumatic braking system has a control unit, a pneumatic circuit, and an air tank configured to supply pneumatic pressure to the pneumatic circuit. The pneumatic circuit has a plurality of valves configured to be individually controlled by the control unit. The leak detection system includes a leak detection module including program code stored on a non-transitory computer readable medium. The program code is configured, when executed by a processor, to individually control the plurality of valves of the pneumatic circuit so as to isolate a sub-circuit of the pneumatic circuit. The leak detection module is configured to monitor a pressure in the pneumatic circuit for leaks, wherein the leak detection module detects a leak in the sub-circuit if the pressure decreases while the sub-circuit is isolated.

According to an embodiment, the pneumatic circuit has a plurality of sub-circuits and the leak detection module is configured to isolate each of the plurality of sub-circuits of the pneumatic circuit.

According to an embodiment, the sub-circuit is a first sub-circuit and the pneumatic circuit has a plurality of further sub-circuits. The leak detection module is configured to isolate further sub-circuits until the leak is located in one of the plurality of further sub-circuits.

According to an embodiment, the leak detection module is integrated in an electronic control unit of the pneumatic braking system.

According to an embodiment, the leak detection module is configured to notify an operator or technician of the vehicle of an identity of the sub-circuit having the leak.

According to an embodiment, the leak detection module is configured to isolate each of the sub-circuits and monitor each of the sub-circuits for leaks automatically.

According to an embodiment, the pressure is monitored via a pressure sensor.

According to an embodiment, the pressure sensor is integrated in the pneumatic braking system.

According to an embodiment, the pneumatic braking system is an electronic braking system and the plurality of valves each have a pressure sensor associated therewith.

According to an embodiment, the pressure is monitored at the air tank.

It is a further object of the disclosure to provide a method for detecting a leak in a pneumatic braking system.

The aforementioned object can, for example, be achieved via a method for detecting a leak in a pneumatic braking system of a vehicle. The pneumatic braking system has an air tank and a pneumatic circuit associated with the air tank, the pneumatic circuit including a plurality of valves. The method includes monitoring a pressure in the pneumatic circuit; individually controlling the plurality of valves so as to isolate a sub-circuit of the pneumatic circuit; and, wherein the leak is detected in the isolated sub-circuit if a decrease in the pressure in the pneumatic circuit is detected via the monitoring of the pressure in the pneumatic circuit.

Such a leak detection system assists the technician and/or vehicle operator in detecting the location of a leak in the pneumatic braking system. By introducing prognostic capabilities according to the disclosure, the overall quality of the pneumatic braking system is improved and the fuel efficiency is increased due to a reduction in compressor run time caused by leaks. This functionality is especially of importance for autonomous vehicles. An autonomous vehicle could perform an automatic leak detection routine according to the disclosure during a scheduled stop, self-check or otherwise, as conditions allow. In an autonomous vehicle where there is no driver to audibly or visually detect a leak, the leak detection system can provide the leak information to the virtual driver or a network.

Leak detection systems according to the disclosure enable a non-invasive localizing of leaks in a pneumatic braking system without the need for disconnection of fittings for installation of gauges, transducers, et cetera. Accordingly, leak detection systems according to the disclosure also make the localizing of leaks safer. Leak detection systems can be automated and do not need to rely on an operator or technician to see or hear the leaks which improves reliability by eliminating human error in the leak detection process.

It is a further object of the disclosure to provide an anti-lock braking system having a leak detection system.

This object can, for example, be achieved via an anti-lock braking system of a vehicle. The anti-lock braking system includes a pneumatic circuit and a pneumatic air tank configured to supply the pneumatic circuit with pneumatic pressure. The pneumatic circuit has a plurality of valves. A control unit is configured to individually control the plurality of valves. A leak detection module is configured to cause the control unit to individually control the plurality of valves of the pneumatic circuit such that a sub-circuit of the pneumatic circuit is isolated. The leak detection module is configured to monitor a pressure at the air tank and to determine a leak in the sub-circuit when detecting a decrease in the pressure at the air tank while the sub-circuit is isolated.

It is a further object of the disclosure to provide an electronic braking system having a leak detection system.

This object can, for example, be achieved via an electronic braking system having a leak detection system as described herein.

BRIEF DESCRIPTION OF THE DRAWINGS

The invention will now be described with reference to the drawings wherein.

DESCRIPTION OF THE PREFERRED EMBODIMENTS

Figure 1:
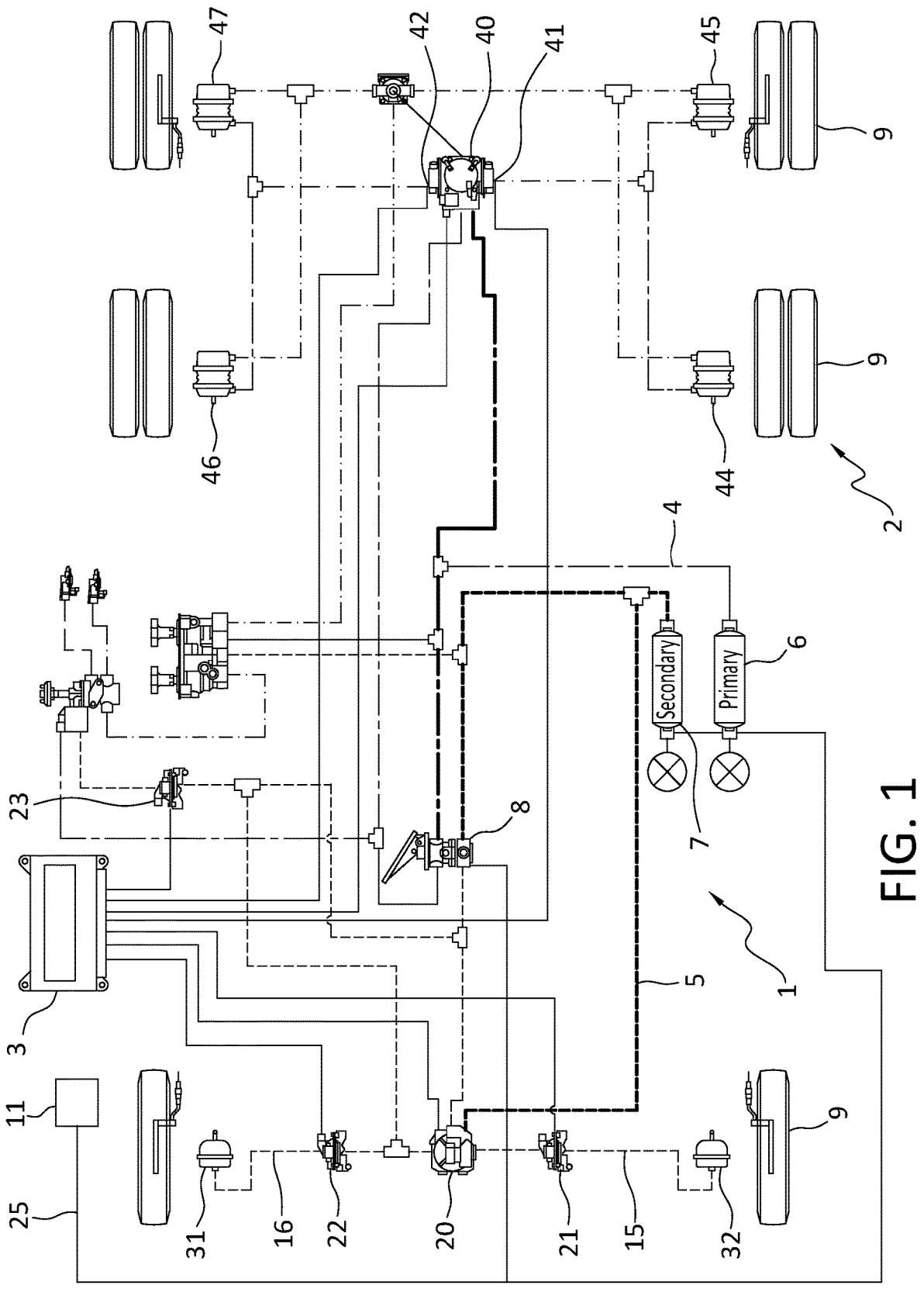
FIG. 1 shows a pneumatic braking system of a vehicle.

FIG. 1 shows a pneumatic braking system 1 of a vehicle 2 having a plurality of wheels 9. The pneumatic braking system 1 has a control unit 3 and a leak detection system 11. The leak detection system 11 can be integrated in the control unit 3. The pneumatic braking system 1 includes a primary pneumatic circuit 4 and a secondary pneumatic circuit 5. The primary circuit 4 is supplied with pneumatic pressure via a primary air tank 6. The secondary circuit 5 is supplied with pneumatic pressure via secondary air tank 7.

The secondary circuit 5 includes a plurality of valves. The plurality of valves includes a front axle active braking valve 20. The plurality of valves of the secondary pneumatic circuit 5 further includes a left front axle valve 21 for a front left brake chamber 31, a right front axle valve 22 for a front right brake chamber 32, and a trailer valve 23 for a trailer. The left front axle valve 21 is connected to the left front brake chamber 31 via pneumatic line 15. The right front axle valve 22 is connected to the right front brake chamber 32 via pneumatic line 16.

The primary pneumatic circuit 4 includes a rear axle braking valve 40 having a rear left side outlet 41 and a rear right side outlet 42. The rear left side outlet 41 is configured to control the supply of pneumatic pressure to the rear left brake chambers 44, 45. The rear right side outlet 42 is configured to control the supply of pneumatic pressure to the rear right brake chamber 46, 47. The control unit 3 controls the rear axle braking valve 40, the rear left side outlet 41, and the rear right side outlet 42.

The control unit 3 is configured to control the valves of the pneumatic braking system 1. The control unit 3 can, for example, be connected to the valves via electrical wires 37. The pneumatic braking system 1 of FIG. 1 further has a brake actuator 8 for actuating the pneumatic braking system 1. The brake actuator 8 can, for example, be a brake pedal, an output of an autonomous driving system or the like. If the pneumatic braking system 1 is in a neutral state and an air leak is detected via pressure loss at an air tank 6, 7, the leak is in the air charging system.

Figure 2:
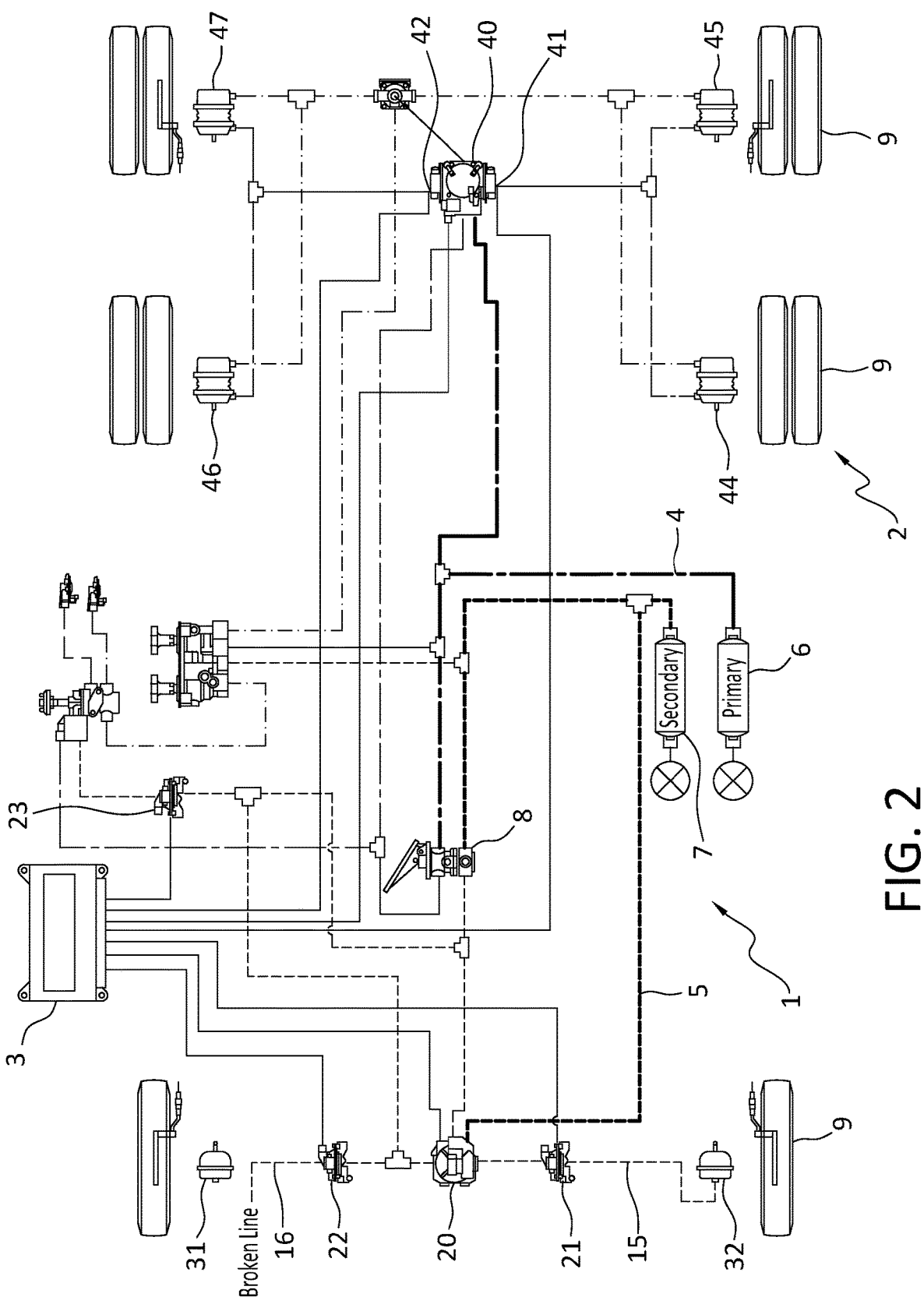
FIG. 2 shows the pneumatic braking system of FIG. 1 with a broken line.
Figure 3:
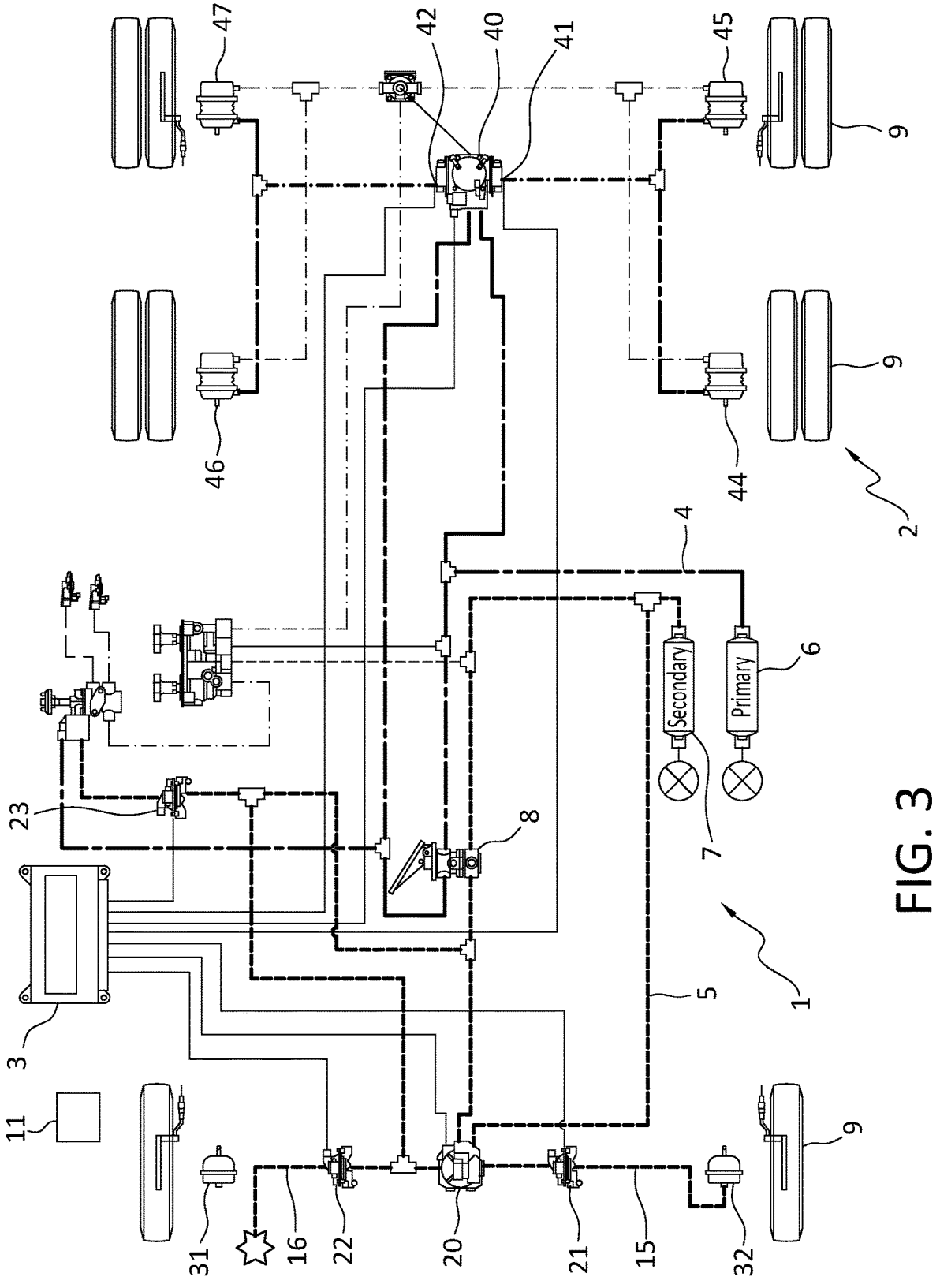
FIG. 3 shows the pneumatic braking system of FIG. 2 with the brakes applied.

An embodiment of the leak detection system 1 according to the disclosure is described below in view of FIGS. 2 to 6. FIG. 2 shows the pneumatic braking system 1 of FIG. 1 with a broken line between the right front axle valve 22 and the front right brake chamber 31. When an operator or an autonomous driving system activates the brake actuator 8, a pressure loss at the secondary air tank 7 would result. The pressure loss at the secondary tank 7 informs the pneumatic braking system 1, the operator, and/or the autonomous driving system of a leak in the secondary pneumatic circuit 5. FIG. 3 shows the braking system 1 of FIG. 2 with the brake actuator engaged and a leak at the pneumatic line 16.

Figure 4:
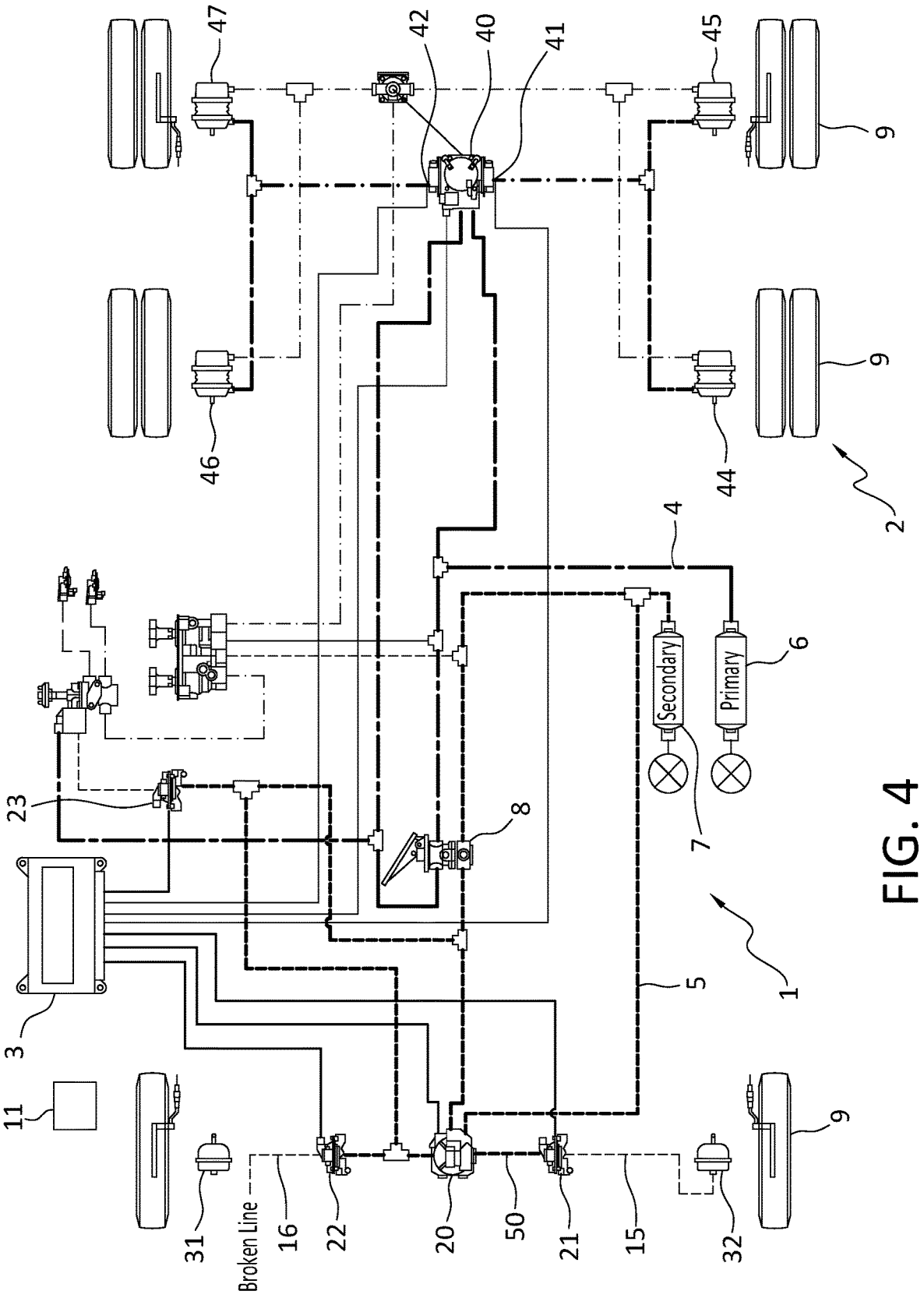
FIG. 4 shows the pneumatic braking system of FIG. 2 with a first sub-section of a pneumatic circuit isolated.

FIG. 4 shows leak detection system 11 isolating a first sub-circuit 50 of the secondary pneumatic circuit 5. The control unit 3 energizes the front axle active braking valve 20. The control unit 3 further energizes, that is closes, the left front axle valve 21, the front right axle valve 22, and the trailer valve 23. If the pressure at the secondary air tank 7 were to drop, the leak detection system 11 determines a leak upstream of the front left modulator valve and the front right modulator valve, that is, in the sub-circuit 50. If a leak were detected in this state, the leak detection system 11 would deactivate the brake actuator 8 and/or instruct the operator/ autonomous driving system to deactivate the brake actuator 8. In this manner, the leak detection system 11 can determine if the leak is upstream or downstream of the front axle active braking valve 20. If no loss of pressure is detected at the secondary air tank when the brake actuator 8 is deactivated, the leak is downstream of the front axle active braking valve 20.

In case of a break in pneumatic line 16 between the right front axle valve 22 and the right front brake chamber 31 as shown in FIG. 4, no pressure loss would be detected at the secondary air tank 7. As there was no loss of pressure at the secondary air tank 7 detected, the leak detection system 11 proceeds to isolate a further sub-circuit of the secondary pneumatic circuit 5.

Figure 5:
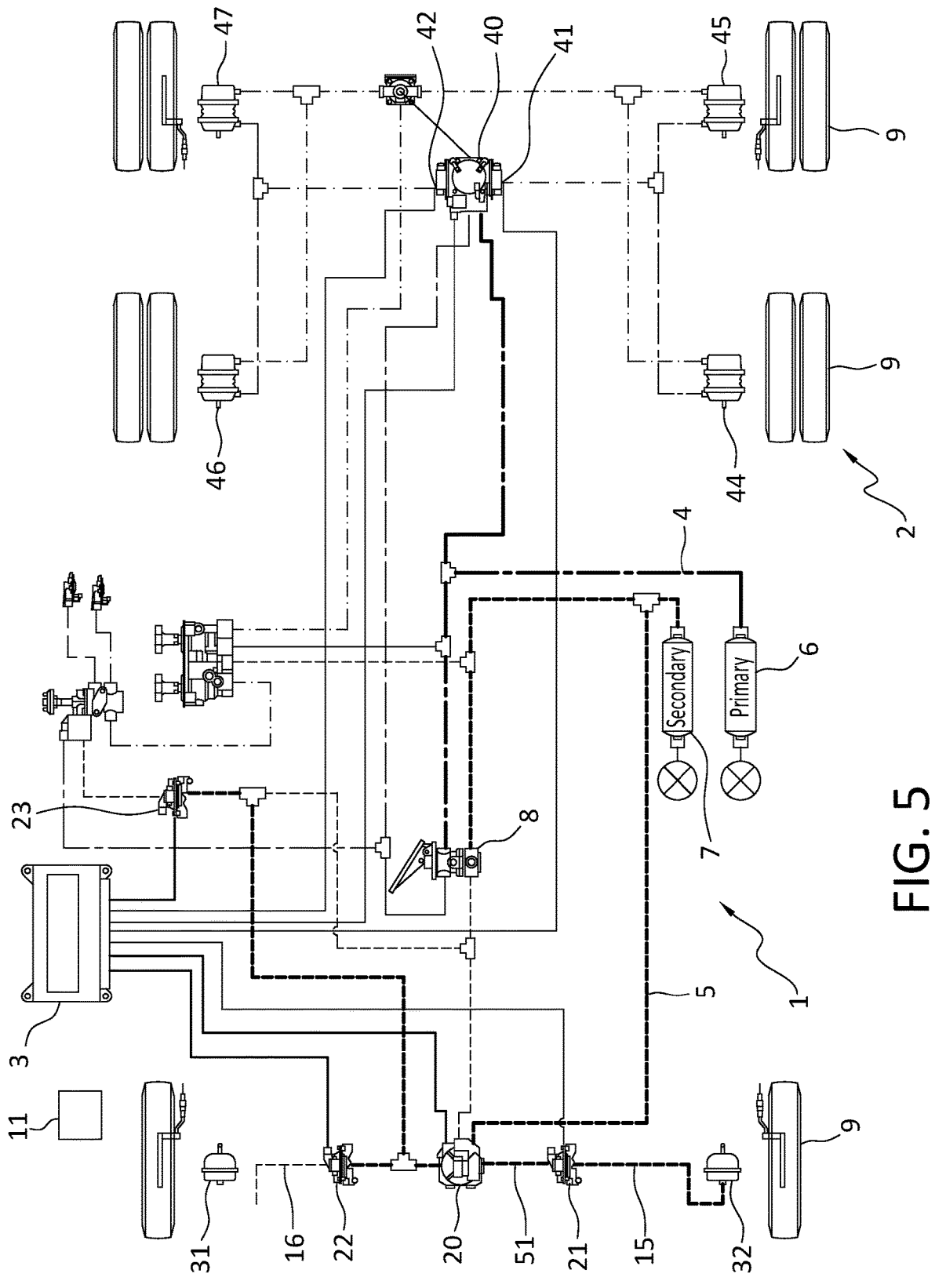
FIG. 5 shows the pneumatic braking system of FIG. 2 with a second sub-section of the pneumatic circuit isolated; and, FIG. 6 shows the pneumatic braking system of FIG. 2 with a third sub-section of the pneumatic circuit isolated; and, FIG. 7 shows an electronic braking system having a leak detection system.

FIG. 5 shows the leak detection system 11 isolating a second sub-circuit 51. The control unit 3 energizes the front axle active braking valve 20, the right front axle valve 22, and the trailer inlet valve 23 while de-energizing the left front axle valve 21. If the pressure at the secondary air tank 7 were to drop, the leak detection system 11 determines that the leak is not downstream of the left front axle valve 21, that is, in sub-circuit 51. In case of a break in pneumatic line 16, no pressure loss would be detected at the secondary air tank 7. As there was no loss of pressure at the secondary air tank 7 detected, the leak detection system 11 proceeds to isolate a further sub-circuit of the secondary pneumatic circuit 5.

Figure 6:
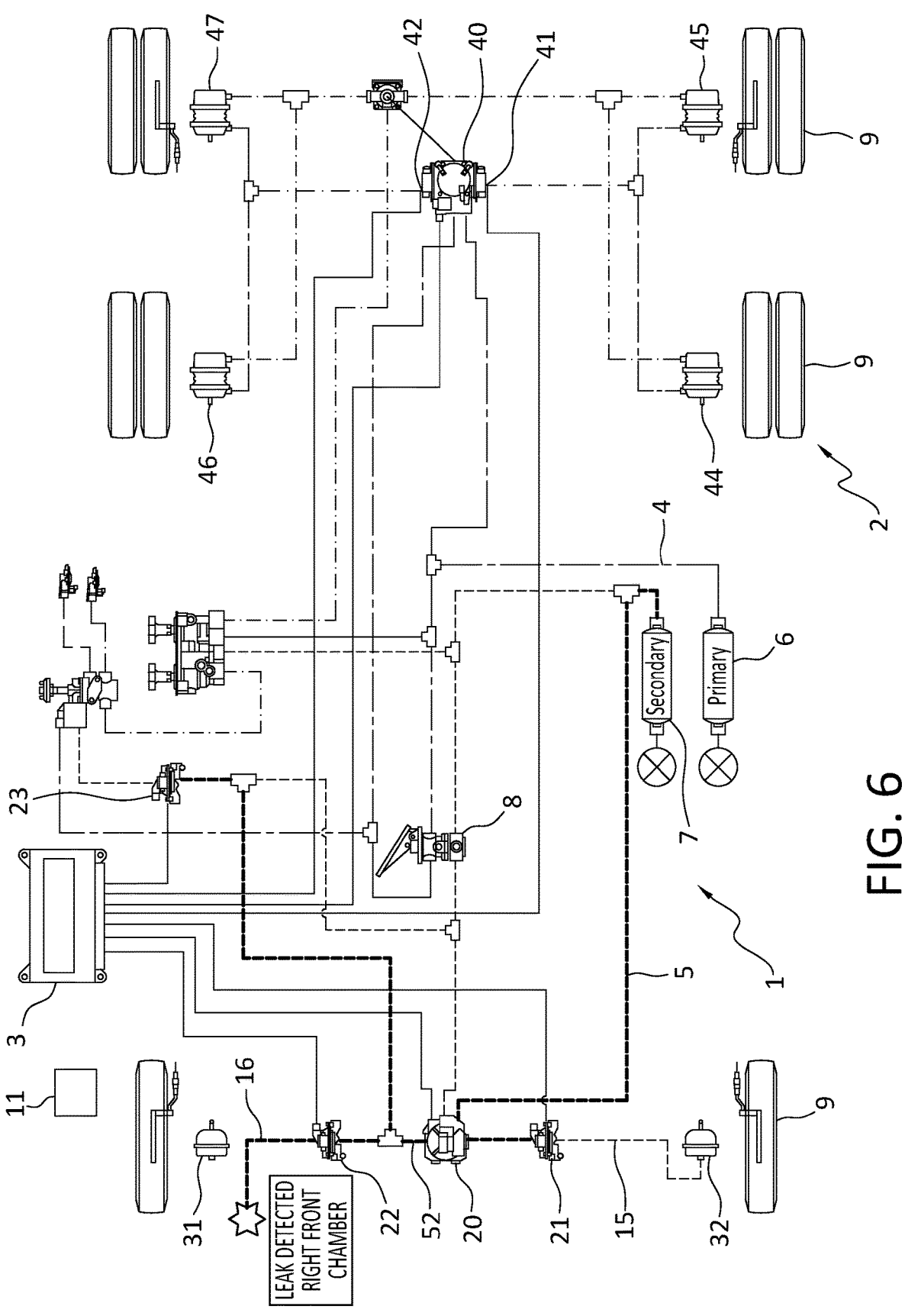

With no leaks detected in the first sub-circuit 50 and the second sub-circuit 51, the leak detection system 11 isolates a third sub-circuit 52 of the secondary pneumatic circuit 5 in FIG. 6. The control unit 3 energizes the front axle active braking valve 20, the left front axle valve 21, and the trailer inlet valve 23 while de-energizing the right front axle valve 22. With the break in the pneumatic line 16 between the right front axle valve 22 and the brake chamber 31, a pressure loss would now occur at the secondary air tank 7. As a result of the pressure loss at the secondary air tank 7, the leak detection system 11 determines a leak in the third sub-circuit 52.

According to an embodiment, the leak detection system 11 notifies the operator of the vehicle 2 of the location of the leak, here, downstream of the right front axle valve 22. According to a further embodiment, the leak detection system 11 outputs the detection of a leak and/or the leak location to an autonomous driving system, a connected application to inform other vehicles, the operator (real or virtual), and/or an external network, for example, a fleet management network or roadside inspector network.

Figure 7:
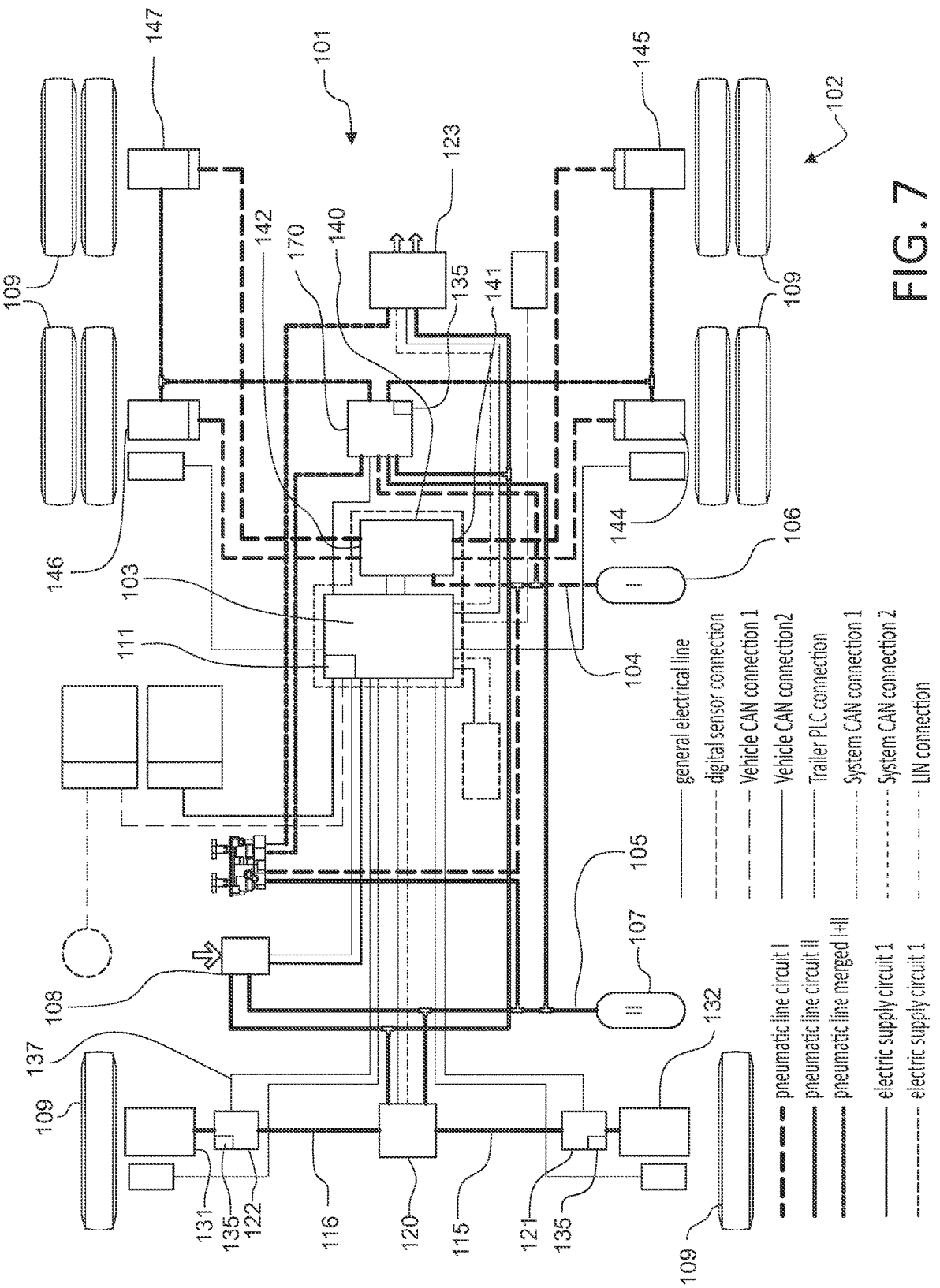

A leak detection system 11 according to the disclosure can be implemented in ABS systems of different configurations with varying valve and pneumatic circuit and sub-circuit configurations. The leak detection systems 11 described herein are illustrated on the basis of an anti-lock braking system. The leak detection system according to the disclosure can, for example, also be implemented in electronic braking systems (EBS) as shown in FIG. 7. According to an embodiment wherein the leak detection system is implemented in an EBS system, the pressure sensors in the axle modulators are used to detect downstream leakage and the air tank supply pressure is used to detect leakage in the circuits between the driver foot valve and the active braking valves.

According to an embodiment, the leak detection system is initiated in an autonomous vehicle under particular conditions. According to a further embodiment, the leak detection system 11 continuously checks for leaks when the driver is not engaged in operating the vehicle 2 or may not be present at the vehicle 2.

A leak detection system according to the disclosure can, for example, utilize existing architecture of a pneumatic ABS system. The valves of the existing pneumatic system, for example, 3/2 valves and ABS solenoid modulator valves, can be used to systematically isolate each pneumatic circuit while monitoring the pressure of the associated air tank via the vehicle's communication network. The leak detection system can be implemented into the software of an existing ABS electronic control unit 3 which controls the valves and can be configured to monitor the air tank pressure over the vehicle's communication network. The leak detection system can also be external and connected to the control unit 3 of the ABS system and the air tank, et cetera, for example, via hardwiring. Additionally, the leak detection system can, for example, also be implemented in an offboard diagnostic tool.

According to an embodiment, the operator of the vehicle can initiate a leak detection system of their vehicle via a dedicated switch, button or other input when at a standstill. According to an embodiment, a leak detection method according to the disclosure is performed and/or initiated automatically.

FIG. 7 shows an electronic braking system 101 of a vehicle 102 having a plurality of wheels 109. The electronic braking system 101 includes an electronic control unit 103, which in the shown embodiment has a leak detection system 111 integrated therein. The leak detection system 111 can also be provided as an external unit from the electronic control unit 103. The electronic braking system 101 includes a primary pneumatic circuit 104 and a secondary pneumatic circuit 105. The primary circuit 104 is supplied with pneumatic pressure via a primary air tank 106. A secondary air tank 107 supplies the secondary circuit 105 with pneumatic pressure.

The secondary circuit 105 includes a plurality of valves. The plurality of valves includes a front axle active electronic braking valve 120. The plurality of valves of the secondary pneumatic circuit 105 further includes a left front axle valve 121 for a front left brake chamber 131, a right front axle valve 122 for a front right brake chamber 132, and a trailer valve 123 for a trailer. The left front axle valve 121 is connected to the left front brake chamber 131 via pneumatic line 115. The right front axle valve 122 is connected to the right front brake chamber 132 via pneumatic line 116.

The primary pneumatic circuit 104 of the electronic braking system 101 includes a rear axle active braking electronic valve 140 having a rear left side outlet 141 and a rear right side outlet 142. The rear axle active braking electronic valve 140 and the front axle active electronic braking valve 120 can have integrated electronic control units. The electronic control units of the axle braking valves 120, 140 are connected to the electronic control unit 103. The rear left side outlet 141 is configured to control the supply of pneumatic pressure to the rear left brake chambers 144, 145. The rear right side outlet 142 is configured to control the supply of pneumatic pressure to the rear right brake chambers 146, 147. The rear axle braking modulator 140, the rear left side outlet 141, and the rear right side outlet 142 are controlled by the control unit 103.

The valves of the electronic braking system 101 are controlled by the control unit 103. The control unit 103 can, for example, be connected to the valves via electrical wires 137. The electronic braking system 101 of FIG. 7 further has a brake actuator 108 for actuating the electronic braking system 101. The brake actuator 108 can, for example, be a brake pedal, an output of an autonomous driving system or the like.

The brake valves 121, 122, 140 can include pressure sensors 135. The leak detection system 111 for an electronic braking system 101 can use the pressure sensor such as a pressure sensor 135 integrated into the brake valve. Further pressure sensors can also be provided in different locations of the electronic braking system 101. A leak detection system as described in the descriptions of FIGS. 2 to 6 can also be applied to the electronic braking system 101 of FIG. 7. The leak detection system 111 can isolate various subcircuits of the primary pneumatic circuit 104 and of the secondary pneumatic circuit 105 in order to isolate the leak. In order to localize the leak, aside from monitoring pressures at the air tanks 106, 107, the leak detection system 111 can use the pressure sensors 135.

It is understood that the foregoing description is that of the preferred embodiments of the invention and that various changes and modifications may be made thereto without departing from the spirit and scope of the invention as defined in the appended claims.

LIST OF REFERENCE NUMERALS

1. Pneumatic braking system
2. Vehicle
3. Control unit
4. Primary pneumatic circuit
5. Secondary pneumatic circuit
6. Primary air tank 7. Secondary air tank
8. Brake actuator
9. Wheels
11. Leak detection system
15. Pneumatic line
16. Pneumatic line
20. Front axle active braking valve
21. Left front axle valve
22. Right front axle valve
23. Trailer valve
31. Front right brake chamber
32. Front left brake chamber
37. Electrical wires
40. Rear axle brake valve
41. Rear left side outlet
42. Rear right side outlet
44. Rear left brake chamber
45. Rear left brake chamber
46. Rear right brake chamber
47. Rear right brake chamber
50. First sub-circuit
51. Second sub-circuit
52. Third sub-circuit
101. Electronic Braking System
102. Vehicle
103. Control unit
104. Primary pneumatic circuit
105. Secondary pneumatic circuit
106. Primary air tank
107. Secondary air tank
108. Brake actuator
109. Wheels
111. Leak detection system
115. Pneumatic line
116. Pneumatic line
120. Front axle active braking electronic valve
121. Left front axle brake valve
122. Right front axle brake valve
123. Trailer valve
131. Front right brake chamber
132. Front left brake chamber
135. Pressure sensors
137 Electrical wires
140. Rear axle active braking electronic valve
141. Rear left side outlet
142. Rear right side outlet
144. Rear left brake chamber
145. Rear left brake chamber
146. Rear right brake chamber
147. Rear right brake chamber
170. Parking Brake Control

What is claimed is:

1. A leak detection system for a pneumatic braking system of a vehicle, the pneumatic braking system having a control unit, a pneumatic circuit, and an air tank configured to supply pneumatic pressure to the pneumatic circuit, the pneumatic circuit having a plurality of valves configured to be individually controlled by the control unit, the leak detection system comprising:

a leak detection module including program code stored on a non-transitory computer readable medium;

said program code being configured, when executed by a processor, to individually control the plurality of valves of the pneumatic circuit so as to isolate a sub-circuit of the pneumatic circuit;

said leak detection module being configured to monitor a pressure in the pneumatic circuit for leaks, wherein the leak detection module detects a leak in the sub-circuit if the pressure decreases while the sub-circuit is isolated; and, wherein the sub-circuit is a first sub-circuit and the pneumatic circuit has a plurality of further sub-circuits; and, said leak detection module is configured to isolate the further sub-circuits until the leak is located in one of the plurality of the further sub-circuits.

2. The leak detection system of claim 1, wherein said leak detection module is integrated in an electronic control unit of the pneumatic braking system.

3. The leak detection system of claim 1, wherein said leak detection module is configured to notify an operator or technician of the vehicle of an identity of the sub-circuit having the leak.

4. The leak detection system of claim 1, wherein said leak detection module is configured to isolate each of the plurality of sub-circuits and monitor each of the plurality of sub-circuits for leaks automatically.

5. The leak detection system of claim 1, wherein the pressure is monitored via a pressure sensor.

6. The leak detection system of claim 5, wherein the pressure sensor is integrated in the pneumatic braking system.

7. The leak detection system of claim 1, wherein the pneumatic braking system is an electronic braking system; and, the plurality of valves each have a pressure sensor associated therewith.

8. The leak detection system of claim 1, wherein the pressure is monitored at the air tank.

9. An electronic braking system comprising a leak detection system of claim 1.

10. A method for detecting a leak in a pneumatic braking system of a vehicle, the pneumatic braking system having an air tank and a pneumatic circuit associated with the air tank, the pneumatic circuit including a plurality of valves, the method comprising:

monitoring a pressure in the pneumatic circuit;

individually controlling the plurality of valves so as to isolate a sub-circuit of the pneumatic circuit; and, wherein the leak is detected in the isolated sub-circuit if a decrease in the pressure in the pneumatic circuit is detected via said monitoring of the pressure in the pneumatic circuit; and, the pneumatic circuit has a plurality of sub-circuits; and, wherein said monitoring the pressure and said individually controlling the plurality of valves is repeated until the leak is detected.

11. The method of claim 10, wherein the plurality of valves includes a front axle braking valve, a left front axle valve, a right front axle valve, and a trailer modulator valve.

12. The method of claim 11, wherein the front axle braking valve, the left front axle valve, the right front axle valve, and the trailer modulator valve are energized so as to isolate a first sub-circuit of the pneumatic circuit.

13. The method of claim 12, wherein the right front axle valve, the front axle active braking valve, and the trailer modulator valve are energized and the left front axle valve is deenergized so as to isolate a second sub-circuit of the pneumatic circuit.

14. The method of claim 13, wherein the left front axle valve, the front axle active braking valve, and the trailer modulator valve are energized and the right front axle valve is deenergized so as to isolate a third sub-circuit of the pneumatic circuit.

15. The method of claim 10 further comprising outputting the location of the leak to at least one of an operator, a technician, an autonomous driving system, and an external system.

16. The method of claim 10, wherein the detection of the leak is outputted to at least one of an external fleet management system and a safety inspection system.

17. An anti-lock braking system of a vehicle, the anti-lock braking system comprising:

a pneumatic circuit;

a pneumatic air tank configured to supply said pneumatic circuit with pneumatic pressure;

said pneumatic circuit having a plurality of valves;

a control unit configured to individually control said plurality of valves;

a leak detection module configured to cause said control unit to individually control said plurality of valves of said pneumatic circuit such that a sub-circuit of said pneumatic circuit is isolated;

said leak detection module being configured to monitor a pressure at the air tank and to determine a leak in said sub-circuit when detecting a decrease in the pressure at the air tank while the sub-circuit is isolated; and, wherein said leak detection module is configured to cause said control unit to individually control the plurality of valves of the pneumatic circuit such that a plurality of sub-circuits of the pneumatic circuit are isolated in succession.

* * * * *